(12) United States Patent
Havard (10) Patent No.: US 10,073,931 B2
(45) Date of Patent: Sep. 11, 2018

(54) METHODS, SYSTEMS, AND COMPUTER READABLE MEDIA FOR OBTAINING POWER CONSUMPTION DATA ASSOCIATED WITH PACKET PROCESSING

(71) Applicant: Ixia, Calabasas, CA (US)

(72) Inventor: Michelle Renee Havard, Fremont, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 0 days.

(21) Appl. No.: 15/291,034

(22) Filed: Oct. 11, 2016

(65) Prior Publication Data
US 2018/0101631 A1    Apr. 12, 2018

(51) Int. Cl.
*G06F 17/50* (2006.01)

(52) U.S. Cl.
CPC ...... *G06F 17/5027* (2013.01); *G06F 2217/78* (2013.01); *G06F 2217/80* (2013.01)

(58) Field of Classification Search
CPC .. G06F 21/76; G06F 22/1712; G06F 17/5027; G06F 17/5054; G06F 2217/78; G06F 17/5009
USPC .......................................... 716/109, 133, 138
See application file for complete search history.

(56) References Cited

U.S. PATENT DOCUMENTS

| | | | | |
|---|---|---|---|---|
| 6,546,496 | B1* | 4/2003 | Wang | G06F 1/3209 713/322 |
| 2006/0277509 | A1* | 12/2006 | Tung | G06F 17/5022 716/109 |
| 2011/0106286 | A1* | 5/2011 | Lupetini | G05B 13/026 700/103 |
| 2015/0025857 | A1* | 1/2015 | Arsovski | G06F 17/5045 703/2 |
| 2015/0095009 | A1* | 4/2015 | Brock | G06F 17/5009 703/21 |
| 2015/0253837 | A1* | 9/2015 | Sukonik | G06F 1/329 713/320 |

OTHER PUBLICATIONS

"IxVeriWave Overview —WiFi Infrastructure Testing," 915-3595-01-8061 Rev A, http://davidhoglund.typepad.com/files/t-ds-ixveriwave-overview.pdf, pp. 1-15 (Accessed Feb. 4, 2017).
"RF and Vector Signal Analysis for Oscilloscopes," SignalVu Datasheet, Tektronix, pp. 1-24 (Sep. 22, 2016).
(Continued)

*Primary Examiner* — Paul Dinh (57) ABSTRACT

Methods, systems, and computer readable media for obtaining power consumption data associated with packet processing are disclosed. One method for obtaining power consumption data associated with packet processing occurs at a test device. The method includes sending, via a first communications interface, at least one test packet to a system under test (SUT). The method also includes receiving, via a second communications interface, power consumption data associated with the at least one test packet. The method further includes correlating the power consumption data and test packet information.

20 Claims, 5 Drawing Sheets

(56) References Cited

OTHER PUBLICATIONS

"Ixia IoT—Comprehensive Wi-Fi IoT Device Testing," IXIA Data Sheet, 915-3611-01-7061 Rev A, https://www.ixiacom.com/sites/default/files/2016-07/915-3595-01-T-DS-Ixia-IoT-Test.pdf, pp. 1-5 (Jul. 2016).

"IxVeriWave—Chassis And Accessories," Ixia Data Sheet, 915-3597-01-8061 Rev B, https://www.ixiacom.com/sites/default/files/2016-07/T-DS-IxVeriWave-Chassis-Accessories.pdf, pp. 1-12 (Jul. 2016).

"WaveAnalyze True 4x4 MIMO Wi-Fi Signal Analyzer with Real-time Signal Processing and Analysis," Ixia, Data Sheet, 915-6027-01 Rev C, pp. 1-5 (Jul. 2015).

"Keysight Technologies: N7109A Multi-Channel Signal-Analyzer," Data Sheet, Keysight Technologies, pp. 1-10 (Apr. 16, 2015).

* cited by examiner

METHODS, SYSTEMS, AND COMPUTER READABLE MEDIA FOR OBTAINING POWER CONSUMPTION DATA ASSOCIATED WITH PACKET PROCESSING

TECHNICAL FIELD

The subject matter described herein relates to system testing. More specifically, the subject matter relates to methods, systems, and computer readable media for obtaining power consumption data associated with packet processing.

BACKGROUND

Non-recurring engineering (NRE) generally refers to non-reoccurring (e.g., one-time) costs associated with researching, developing, designing, verifying, and testing a new product. Integrated circuit (IC) or chip manufacturers may incur significant NRE costs when developing a new IC or chip. For example, a chip design process may utilize various electronic design automation (EDA) tools and other mechanisms for testing or verifying a chip design prior to silicon fabrication and/or mass production.

To minimize costs associated with testing or verifying chip designs, some manufacturers use field-programmable gate array (FPGA) prototyping for testing application-specific integrated circuit (ASIC) or system on a chip (SoC) designs prior to silicon fabrication. However, even using FPGA prototyping and/or conventional EDA tools, some chip design issues, including power consumption issues and/or overheating, may be difficult to ascertain or may not be ascertained early enough to avoid significant wasted resources.

SUMMARY

Methods, systems, and computer readable media for obtaining power consumption data associated with packet processing are disclosed. One method for obtaining power consumption data associated with packet processing occurs at a test device. The method includes sending, via a first communications interface, at least one test packet to a system under test (SUT). The method also includes receiving, via a second communications interface, power consumption data associated with the at least one test packet. The method further includes correlating the power consumption data and test packet information.

A system for obtaining power consumption data associated with packet processing includes at least one processor and a test device implemented using the at least one processor. The test device is configured for sending, via a first communications interface, at least one test packet to an SUT; for receiving, via a second communications interface, power consumption data associated with the at least one test packet; and for correlating the power consumption data and test packet information.

The subject matter described herein may be implemented in software in combination with hardware and/or firmware. For example, the subject matter described herein may be implemented in software executed by a processor. In some embodiments, the subject matter described herein may be implemented using a non-transitory computer readable medium having stored thereon computer executable instructions that when executed by the processor of a computer control the computer to perform steps. Various computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computing platform or may be distributed across multiple devices or computing platforms.

As used herein, the term "node" refers to at least one physical computing platform including one or more processors, network interfaces, and memory.

As used herein, each of the terms "function" and "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for obtaining power consumption data associated with packet processing. When testing and/or verifying a chip design, a test platform may be capable of performing various tests with various goals by generating test traffic and monitoring and/or analyzing a chip's response to the test traffic. However, issues can arise regarding power consumption and/or utilization at the chip. To minimize wasted resources (e.g., time and money) associated with manufacturing power-inefficient chips and/or chips prone to overheating, it is important to identify power related issues early in the chip design process. This also allows the silicon architects to make architectural trade-offs early in the design process, and decreasing costly verification cycle time for silicon manufacturers.

In accordance with some aspects of the subject matter described herein, techniques, methods, systems, or mechanisms for obtaining power consumption data associated with a system under test (SUT) are disclosed. For example, an example test system may be configured to send, via a first communications interface, test packets (e.g., Internet protocol (IP) or Ethernet packets) to an SUT (e.g., a field-programmable gate array (FPGA)) and to receive, via the second communications interface, per-packet power consumption data from the SUT or a related power analyzer. In this example, the test system may correlate the power consumption data and test packet information for computing power consumption related metrics and/or reports for test and/or design verification purposes.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
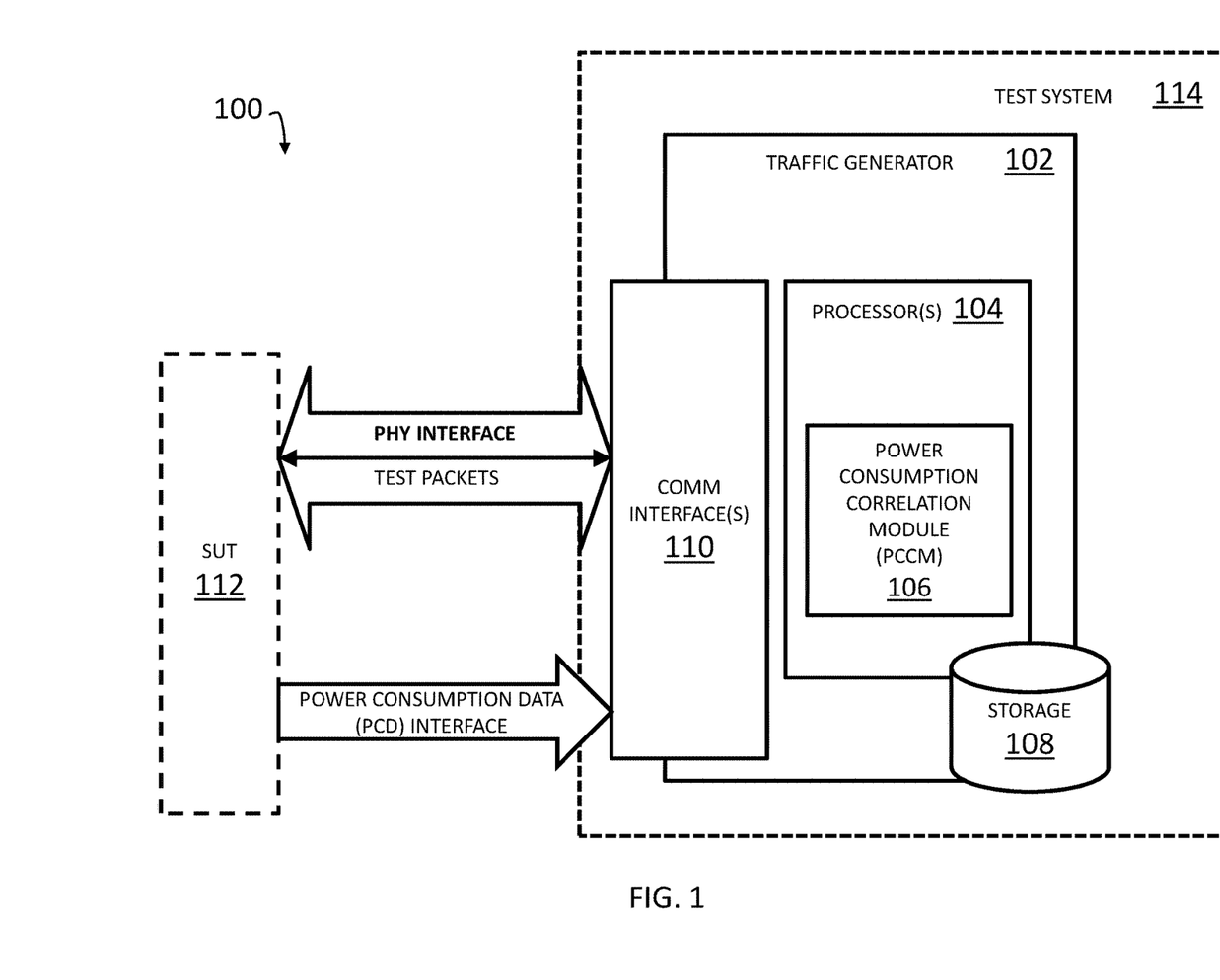
FIG. 1 is a block diagram illustrating an example computing environment for obtaining power consumption data associated with packet processing.

FIG. 1 is a diagram illustrating an example computing environment 100 for obtaining power consumption data associated with packet processing. Referring to FIG. 1, environment 100 may include test system 114 and a system under test (SUT) 112. Test system 114 may represent any suitable entity or entities (e.g., one or more computing platforms, a test device, or a server farm) for performing aspects related to system testing, e.g., performing chip design verification using test packets and per-packet power consumption data. In some embodiments, test system 114 may be configured to perform one or more aspects associated with testing a system under test (SUT), such as SUT 112. In some embodiments, test system 114 may be a stand-alone tool, a testing device, or software executing on at least one processor. In some embodiments, test system 114 may be a single node or may be distributed across multiple computing platforms or nodes.

In some embodiments, test system 114 may simulate or emulate one or more network nodes. For example, test system 114 may emulate a network switch or forwarding device. In some embodiments, the emulated network node(s) may interact with other emulated entities (e.g., emulated user devices) and/or SUT 112.

SUT 112 may represent any suitable entity or entities (e.g., one or more computing platforms, an integrated circuit (IC), an application-specific integrated circuit (ASIC), an FPGA, a programmable logic device (PLD), a system on a chip (SoC), and/or software executing on a processor) for interacting with and/or for being tested and/or analyzed by test system 114. In some embodiments, SUT 112 may include a logic device (e.g., a FPGA or SoC) and a power analyzer, e.g., a hardware device or a vector signal analyzer (VSA), for monitoring and/or providing power consumption data associated with the logic device. For example, SUT 112 may include an FPGA representing a prototype ASIC or SoC design. In this example, the FPGA may be tested as part of a "pre-silicon" design validation process, where, during the testing, a power analyzer may analyzes the FPGA or points therein to derive or obtain power consumption data associated with processing test packets. Example power consumption data may include a measurement, a value, or other information indicative of power consumed by SUT 112 in processing (e.g., receiving, handling, analyzing, routing, and/or responding to) one or more packets. Continuing with this example, the power analyzer may be configured to provide, to test system 114, power consumption information regarding the processing of the test packets, e.g., via a communications interface that is distinct (e.g., different) from a communications interface between the FPGA and test system 114.

In some embodiments, SUT 112 may include emulation software usable for chip design validation and/or related testing. In such embodiments, the emulation software may be configured for emulating a logic device (e.g., an IC, an SoC, a PLD, an FPGA, an ASIC, etc.) and/or for providing power consumption data (e.g., instantaneous and/or per-packet power consumption data). For example, SUT 112 may include an emulated SoC configured to process test packets received via a first communications interface and to provide power consumption information regarding the processing of the test packets.

Test system 114 may include a traffic generator 102. Traffic generator 102, also referred to as a port module, may include any suitable entity or entities (e.g., e.g., an ASIC, an IC, an FPGA, a PLD, an SoC, and/or software executing on processor(s) 104) for receiving data, transmitting data, and/or processing data. For example, a port module may comprise an Xcellon-Ultra™ card manufactured by IXIA® or a portion therein (e.g., a physical port with a dedicated processor and memory) and may be configured to simulate or emulate packets associated with various nodes or devices. In this example, multiple port modules may comprise a different portion (e.g., a separate physical port and associated resources) of the Xcellon-Ultra™ card or may be associated with a different Xcellon-Ultra™ card.

Traffic generator 102 may include one or more processor(s) 104, a power consumption correlation module (PCCM) 106, a storage 108, and one or more communications interface(s) 110. Processor(s) 104 may represent any suitable entity or entities for executing software and/or modules (e.g., PCCM 106) stored in a memory (e.g., storage 108 and/or other memory). In some embodiments, processor(s) 104 may include a microprocessor, a central processing unit (CPU), or any other like hardware based processing unit. In some embodiments, PCCM 106 and/or various aspects of the disclosed subject matter can be stored in storage 108 or other memory.

Storage 108 may represent any suitable entity (e.g., a non-transitory computer readable medium, random access memory (RAM), read only memory (ROM), optical read/write memory, cache memory, magnetic read/write memory, flash memory, embedded memory, or a memory device) for storing data associated with testing SUT 112 and/or related test results. Example data stored at storage 108 may include one or more traffic tests, test configurations, test results, traffic generated during tests, traffic received during tests, test statistics, test logs, power consumption data (e.g., real-time and/or instantaneous per-packet power consumption data), power consumption metrics associated with SUT 112, and/or other information about SUT 112.

In some embodiments, processor(s) 104 and/or storage 108 can be used to execute, implement, and/or manage various aspects of testing SUT 112, and/or obtaining and/or utilizing power consumption data for chip design validation and other purposes, such as PCCM 106 or portions thereof.

Communications interface(s) 110 may represent any suitable entity or entities (e.g., one or more network interface cards or portions thereof) for communicating with various entities. For example, traffic generator 102 may use communications interface(s) 110 for communicating data between SUT 112 via one or more physical or virtual ports, communications interfaces, or connections. In some embodiments, communications interface(s) 110 may include functionality for communicating with SUT 112 using a physical layer (PHY) interface protocol, a common public radio interface (CPRI) protocol, or other protocols. For example, a PHY interface and/or link may connect a test port (e.g., traffic generator 102) of test system 114 to a communications port associated with SUT 112.

In some embodiments, communications interface(s) 110 may also include functionality for communicating with a power analyzer and/or SUT 112 and/or for receiving power consumption data using one or more communications protocols. For example, a PCD interface and/or link may be used to obtain instantaneous power consumption and/or utilization data from SUT 112 or related entities (e.g., a power analyzer).

PCCM 106 may include any suitable entity or entities (e.g., e.g., an ASIC, an IC, an FPGA, a PLD, an SoC, and/or software executing on processor(s) 104) for performing one or more aspects associated with receiving, correlating, analyzing, and/or reporting power consumption data associated with SUT 112. For example, PCCM 106 may receive, via a PCD interface or other communications interface, instantaneous power consumption data associated with processing test packets at SUT 112.

In some embodiments, PCCM 106 may correlate power consumption data and test packet information using timestamps and/or other stored data. For example, test system 114 and/or modules therein (e.g., traffic generator 102 and/or PCCM 106) may generate and/or store timestamp information regarding test packets, response packets, and/or power consumption data. In this example, timestamp information may be usable by PCCM 106 for correlating test packets with instantaneous power consumption data associated with processing the test packets.

In some embodiments, PCCM 106 may analyze correlated power consumption data using one or more algorithms and/or statistical functions for computing various metrics. Some example power consumption metrics may include an average power consumption value per packet, an average power consumption value per packet stream (e.g., a group of packets or a transaction), and/or an average power consumption value per test session, a maximum or peak power consumption value associated with a packet type, a maximum or peak power consumption value associated with a packet stream, a maximum or peak power consumption value associated with a test session, a minimum power consumption value associated with a packet type, a minimum power consumption value associated with a packet stream, and/or a minimum power consumption value associated with a test session.

In some embodiments, test system 114 and/or PCCM 106 may analyze and/or determine dynamic power consumption for particular chip designs based on particular test sessions or packet sequences. For example, when testing a chip design for handling high port count and/or high switching activity in next generation switches, test system 114 may trigger a first test session involving a stream of IP v4 packets and correlate per-packet power consumption data with these packets during the first test session and then may trigger a second test session involving a stream of IP v6 packets and correlate per-packet power consumption data with these packets during the second test session. In this example, test system 114 and/or PCCM 106 may compute various power consumption metrics for each session and may report any abnormal metrics detected (e.g., based on a predetermined threshold or percentage) and/or may indicate whether power consumption was significantly different between the test sessions.

In some embodiments, test system 114 and/or PCCM 106 may analyze and/or determine "hotspots" or probability of "hotspots" in SUT 112. For example, chip designers can use test system 114 to test a chip design for "hotspots" by determining whether certain sampling points in the chip are likely to overheat during a first test session. In this example, if the first test session indicates overheating is possible, a more strenuous second test session may be used to determine whether the chip will actually overheat. Continuing with this example, using various test sessions with various packet sequences or packet types, test system 114 and/or PCCM 106 may determine a probability for overheating or "hotspots" in a particular chip design.

In some embodiments, test system 114 and/or PCCM 106 may analyze and/or determine power consumption related effects, such as process variation, aging effects, and/or stress effects, for SUT 112. For example, by sending certain H.265 packets for extended periods, test system 114 and/or PCCM 106 may determine or predict battery life and/or video quality for streaming H.265 devices, e.g., smartphones.

In some embodiments, test system 114 and/or PCCM 106 may generate one or more test reports that include power consumption metrics or information derived therefrom. For example, for a test session involving multiple packet sequences and/or packet types, a test report may indicate average power consumption at one or more sampling points for each packet sequence or packet type. In another example, a test report may indicate an average power consumption at one or more sampling point during a test session and may also indicate any metrics (e.g., maximum power consumption values at different signaling points in SUT 112) that appear abnormal (e.g., based on predetermined percentage or threshold value). In this example, the test report may indicate additional tests to perform and/or possible causes for the abnormal values.

It will be appreciated that FIG. 1 is for illustrative purposes and that various nodes, their locations, and/or their functions (e.g., modules) described above in relation to FIG. 1 may be changed, altered, added, or removed. For example, some nodes and/or functions may be combined into a single entity. In another example, some nodes and/or functions may be distributed across multiple nodes and/or platforms.

Figure 2:
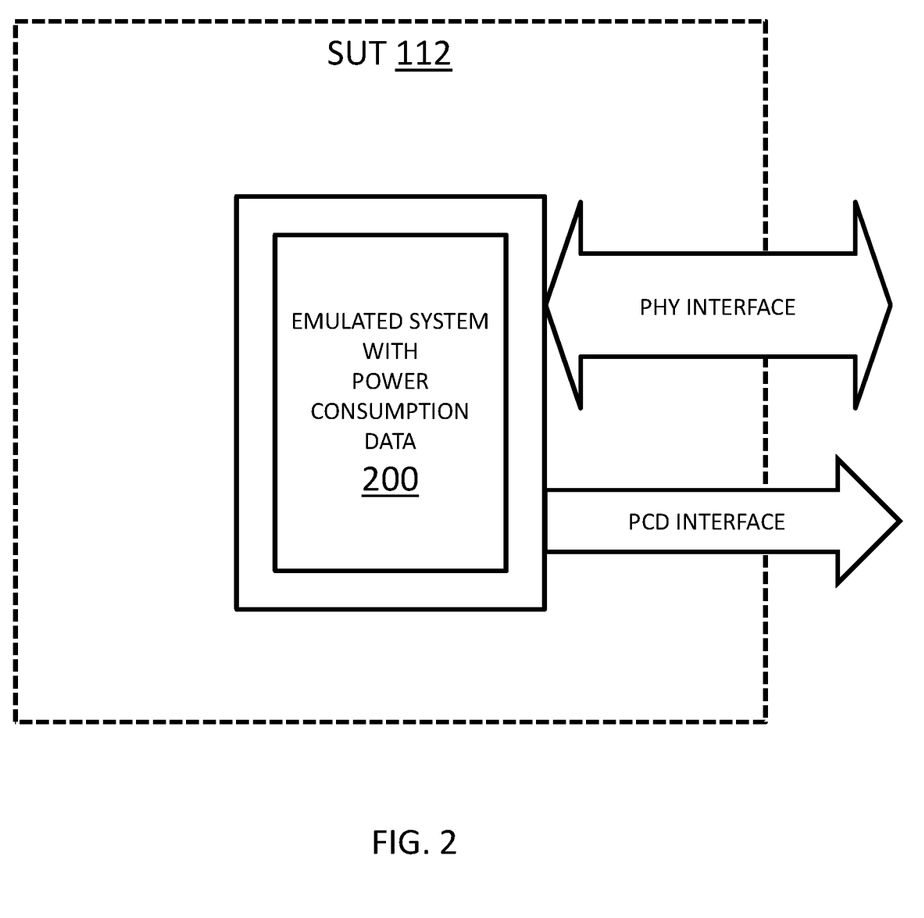
FIG. 2 is a diagram illustrating an emulated system providing power consumption data.

FIG. 2 is a diagram illustrating an emulated system 200 providing power consumption data. In some embodiments, SUT 112 may include or represent emulated system 200. Emulated system 200 may represent or include any entity or entities (e.g., an FGPGA, an ASIC, software executing on at least one processor) for performing various actions, e.g., emulating a chip or a logic device that processes test packets and/or provides per-packet power consumption data related to packet processing). For example, emulated system 200 may include at least one processor executing software that emulates an SoC for testing and/or design verification purposes. In this example, the software may also be capable of providing power consumption data associated with processing of one or more test packets by the emulated SoC.

In some embodiments, emulated system 200 may be configured to compute (e.g., instantaneous, average, minimum, maximum, etc.) power consumption data and to provide this power consumption data to test system 114 or module(s) therein via one or more communications interfaces.

In some embodiments, emulated system 200 may be configured to sample power consumption at discrete intervals and may apply timestamps to power consumption data values obtained at each sampling point, such that emulated system 200 provides test system 114 or module(s) therein with timestamped power consumption data.

In some embodiments, emulated system 200 may be configured to emulate sampling power consumption at discrete intervals and may apply timestamps to emulated power consumption data values, such that emulated system 200 provides test system 114 or module(s) therein with timestamped power consumption data.

In some embodiments, where timestamped data is provided by SUT 112 or a related entity (e.g., emulated system 200), test system 114 and SUT 112 or the related entity (e.g., emulated system 200) may synchronize clocks prior to and/or during a test using a timing synchronization protocol.

It will be appreciated that FIG. 2 is for illustrative purposes and that various nodes, their locations, and/or their functions (e.g., modules) described above in relation to FIG. 2 may be changed, altered, added, or removed. For example, some nodes and/or functions may be combined into a single entity. In another example, some nodes and/or functions may be distributed across multiple nodes and/or platforms.

Figure 3:
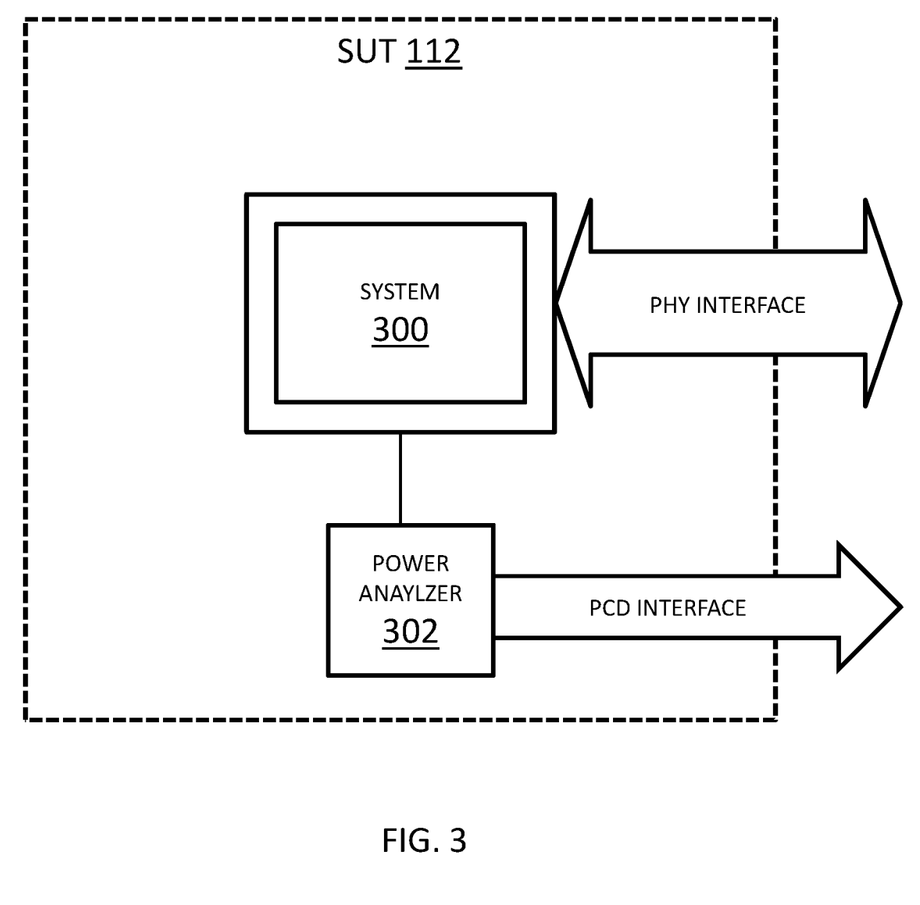
FIG. 3 is a diagram illustrating an example SUT including a power analyzer for providing power consumption data.

FIG. 3 is a diagram illustrating an example SUT including a power analyzer for providing power consumption data. In some embodiments, SUT 112 may represent a system 300 and a power analyzer 302. System 300 may represent or include any entity or entities (e.g., a PLD, an FGPGA, an ASIC, a logic device, etc.) for performing various actions, e.g., processing test packets). For example, SUT 112 may include an FPGA that represents a proposed SoC design. In another example, system 300 may include multiple chips or logic devices connected via an internal communications mechanism (e.g., a communications bus or switching network). In this example, communications may be routed or forwarded to or from various chips via the internal communications mechanism.

Power analyzer 302 may represent or include an external power measurement device and/or tool that is associated with or connected to system 300. For example, power analyzer 302 may include at least some hardware (e.g., a VSA) for monitoring power consumption at one or more sampling points in system 300 during a test session. In this example, power analyzer 302 may provide, to test system 114 or module(s) therein, power consumption data associated with processing one or more test packets by system 300.

In some embodiments, system 300 may utilize a communications interface for receiving test packets that is separate or different from a communications interface used by power analyzer 302 for sending power consumption data. In some embodiments, system 300 and power analyzer 302 may communicate via one or more communications interfaces.

In some embodiments, power analyzer 302 may be configured to compute (e.g., instantaneous, average, minimum, maximum, etc.) power consumption data and to provide this power consumption data to test system 114 or module(s) therein via one or more communications interfaces.

In some embodiments, power analyzer 302 may be configured to sample power consumption at discrete intervals and may apply timestamps to various power consumption data values obtained or computed, such that power analyzer 302 provides test system 114 or module(s) therein with timestamped power consumption data.

In some embodiments, where timestamped data is provided by SUT 112 or a related entity (e.g., power analyzer 302), test system 114 and SUT 112 or the related entity (e.g., power analyzer 302) may synchronize clocks prior to and/or during a test using a timing synchronization protocol.

It will be appreciated that FIG. 3 is for illustrative purposes and that various nodes, their locations, and/or their functions (e.g., modules) described above in relation to FIG. 3 may be changed, altered, added, or removed. For example, some nodes and/or functions may be combined into a single entity. In another example, some nodes and/or functions may be distributed across multiple nodes and/or platforms.

Figure 4:
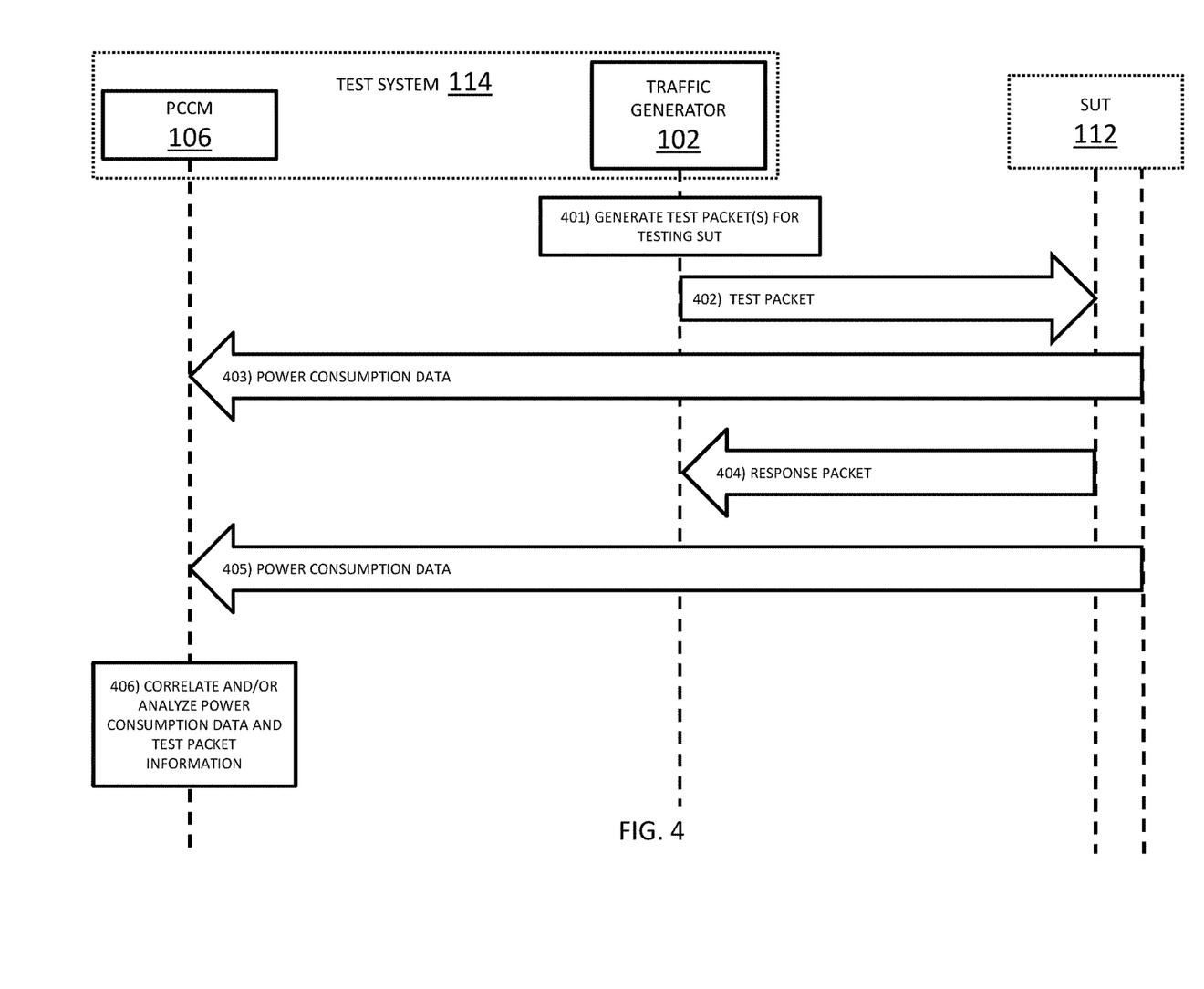
FIG. 4 is a diagram illustrating obtaining power consumption data associated with packet processing.

FIG. 4 is a diagram illustrating obtaining power consumption data associated with packet processing. In some embodiments, test system 114 may test and/or analyze SUT 112 using traffic generator 102 and PCCM 106. For example, traffic generator 102 may generate various test packets for testing SUT 112 and PCCM 106 may receive, correlate, and/or analyze power consumption data associated with the test packets.

In some embodiments, traffic generator 102 may represent a particular test port that communicates with SUT 112 and/or modules therein via one or more communications interfaces (e.g., a PHY interface). For example, test system 114 may utilize multiple test ports for testing different features and/or different types of traffic at SUT 112. In another example, test system 114 may utilize multiple test ports for receiving power consumption information from SUT 112 or power analyzer 302. In this example, where traffic generator 102 receives power consumption data from SUT 112 or power analyzer 302, traffic generator 102 may send the power consumption data to PCCM 106 for processing (e.g., correlation and/or analysis) or for storing the data in storage 108 for later processing.

In some embodiments, PCCM 106 may communicate with SUT 112 or power analyzer 302 via one or more communications interfaces (e.g., a PCD interface). In some embodiments, PCCM 106 may communicate with traffic generator 102 and/or storage 108 via one or more communications interfaces (e.g., an internal communications bus). For example, PCCM 106 may obtain test packet information and/or power consumption data via traffic generator 102 or storage 108.

Referring to FIG. 4, in step 401, at least one test packet may be generated by traffic generator 102. For example, assuming SUT 112 includes a PLD or an SoC for a data center grade or top-of-rack (ToR) switch, Ethernet and/or IP packets may be generated for testing SUT 112.

In step 402, the at least one test packet may be sent from traffic generator 102 to SUT 112. For example, traffic generator 102 may send one or more packets via a PHY interface.

In step 403, power consumption data associated with the at least one test packet may be sent from SUT 112 to PCCM 106. For example, power analyzer 302 may determine power consumption data associated with processing a received test packet. In this example, power analyzer 302 may send an Ethernet packet or other message containing the power consumption data to PCCM 106 via a communications interface.

In step 404, at least one response packet may be sent from SUT 112 to traffic generator 102. For example, SUT 112 may send a response or acknowledgement packet acknowledging that one or more test packets were received from traffic generator 102.

In step 405, power consumption data associated with the at least one response packet may be sent from SUT 112 to PCCM 106. For example, power analyzer 302 may determine power consumption data associated with generating a response packet to a received test packet and may send an Ethernet packet or other message containing the power consumption data to PCCM 106 via a communications interface.

In some embodiments, power consumption data may be sent periodically (e.g., every 5 seconds) or aperiodically (e.g., dynamically, such as after one or more packets are processed and/or generated). For example, instead of sending a power consumption data message after processing a test packet and another power consumption data message after generating a response packet, SUT 112 or power analyzer 302 may send a single power consumption data message containing power consumption data associated with both events; e.g., processing the test packet and generating the response message.

It will be appreciated that the communications and/or actions depicted in FIG. 4 are for illustrative purposes and that different and/or additional communications and/or actions than those depicted in FIG. 4 may be used for testing SUT 112, obtaining power consumption data, and/or related activities. It will also be appreciated that various communications and/or actions described herein may occur concurrently or in a different order or sequence.

Figure 5:
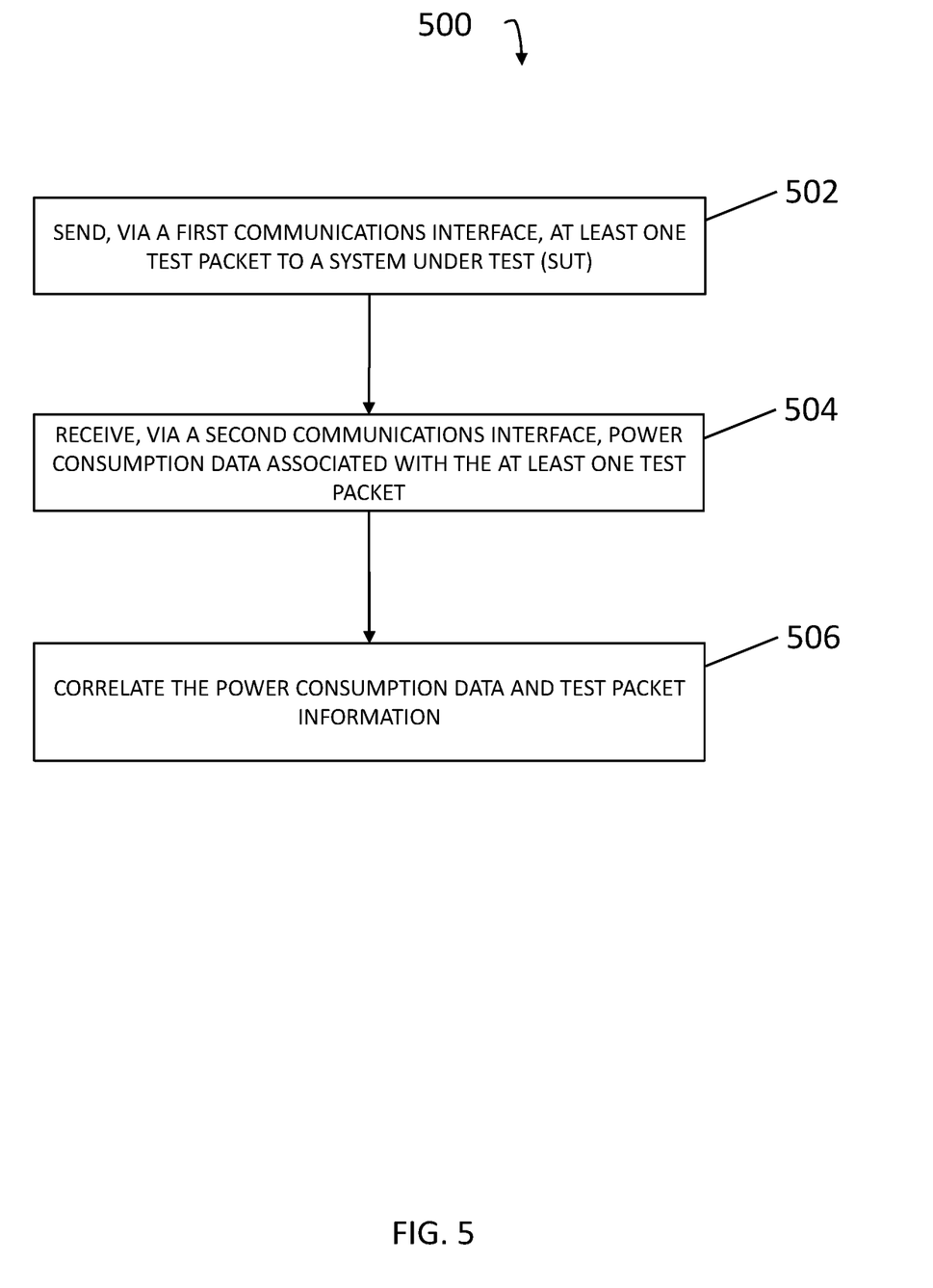
FIG. 5 is a flow diagram illustrating a process for obtaining power consumption data associated with packet processing.

FIG. 5 is a flow diagram illustrating an example process 500 for obtaining power consumption data associated with packet processing. In some embodiments, process 500, or portions thereof, may be performed by or at test system 114, PCCM 106, processor(s) 104, a test device, traffic generator 102, and/or another node or module. In some embodiments, process 500 may include steps 502, 504, and/or 506.

Referring to process 500, in step 502, at least one test packet may be sent, via a first communications interface, to SUT 112. In some embodiments, a first communications interface may include a physical layer interface. For example, test system 114 or a module therein (e.g., traffic generator 102) may send a test packet (e.g., an IP or TCP packet) to SUT 112 via a PHY interface.

In step 504, power consumption data associated with the at least one test packet may be received, via a second communications interface. In some embodiments, a second communications interface may be the same as a first communications interface. In some embodiments, a second communications interface may be distinct from a first communications interface. For example, after processing a test packet, SUT 112 or power analyzer 302 may send, via a PCD interface or another communications interface, power consumption data to test system 114 or a module therein.

In some embodiments, power consumption data may include instantaneous power consumption data associated with processing, by SUT 112, at least one test packet. In some embodiments, power consumption data may include average power consumption data associated with processing, by SUT 112, at least one test packet. In some embodiments, power consumption data may be from one or more sampling points in SUT 112. In some embodiments, where a statistical function is performed using power consumption data, data values may be from one or more sampling points and/or sampled (e.g., measured) at different times.

In some embodiments, power consumption data may include a timestamp associated with the power consumption data. For example, power analyzer 302 may include a clock and a timestamp mechanism for indicating when a power consumption data value was obtained or computed.

In step 506, the power consumption data and test packet information may be correlated. In some embodiments, correlating power consumption data and test packet information may include using a timestamp associated with the power consumption data and a timestamp associated with at least one test packet for correlation. For example, PCCM 106 may correlate power consumption data with test packets that have timestamps that are substantially the same or within a predetermined threshold, e.g., that are within a few milliseconds or microseconds of each other.

In some embodiments, a timestamp associated with power consumption data and/or a timestamp associated with at least one test packet may be generated or obtained by a test device (e.g., test system 114 or a related module). For example, test system 114 may generate timestamps when packets are sent to SUT 112 and/or may generate timestamps when power consumption data is received from SUT 112 or power analyzer 302. In another example, test system 114 may obtain timestamps from received messages or packets.

In some embodiments, process 500 may further include generating, using the power consumption data and test packet information, a report. For example, PCCM 106 may generate a report indicating various power consumption metrics derived from received power consumption data and test packet information.

In some embodiments, PCCM 106 may also generate a report that include time information associated with various power consumption metrics, such as when a peak power consumption value is reached by SUT 112 and/or how often a new peak power consumption value is identified.

In some embodiments, SUT 112 may include an SoC, an emulated SoC, a PLD, an emulated PLD, a FPGA, an emulated FPGA, an ASIC, an emulated ASIC, or a hardware processor.

It will be appreciated that process 500 is for illustrative purposes and that different and/or additional actions may be used. It will also be appreciated that various actions described herein may occur in a different order or sequence.

It should be noted that test system 114, traffic generator 102, PCCM 106, and/or functionality described herein may constitute a special purpose computing device. Further, test system 114, traffic generator 102, PCCM 106, and/or functionality described herein can improve the technological field of chip design verification by providing mechanisms (e.g., via one or more communications interfaces) for obtaining power consumption data (e.g., per-packet instantaneous power consumption data) associated with packet processing at SUT 112 and/or for using such information in generating various power consumption metrics and/or related reports. Furthermore, test system 114, traffic generator 102, PCCM 106, and/or functionality described herein can utilize or include one or more improvements to computer-related technology and/or computer functionality. For example, by obtaining and using correlated power consumption data associated with packet processing, chips that are energy efficient and/or safe from overheating can be designed more quickly and at lower costs because power consumption issues can be ascertained more quickly and more efficiently during design testing and verification.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for obtaining power consumption data associated with packet processing, the method comprising:
   at a test device:
      sending, via a first communications interface, at least one test packet to a system under test (SUT), wherein a timestamp associated with the at least one test packet is generated by the test device;
      receiving, via a second communications interface, power consumption data associated with the at least one test packet, wherein a timestamp associated with the power consumption data associated with the at least one test packet is generated or obtained by the test device;
      correlating the power consumption data and test packet information to generate at least one packet related power consumption metric, wherein correlating the power consumption data and the test packet information includes using the timestamp associated with the power consumption data and the timestamp associated with the at least one test packet for correlation; and
      generating, using the correlated power consumption data and test packet information, the at least one packet related power consumption metric.

2. The method of claim 1 comprising:
   generating, using the power consumption data and test packet information, a report.

3. The method of claim 1 wherein the first communications interface includes a physical layer interface.

4. The method of claim 1 wherein the SUT includes a system on a chip (SoC), an emulated SoC, a field-programmable gate array (FPGA), an emulated FPGA, an application-specific integrated circuit (ASIC), an emulated ASIC, or a hardware processor.

5. The method of claim 1 wherein the second communications interface is distinct from the first communications interface.

6. The method of claim 1 wherein the second communications interface is the same as the first communications interface.

7. The method of claim 1 wherein the power consumption data includes instantaneous power consumption data associated with processing, by the SUT, the at least one test packet.

8. The method of claim 1 wherein the power consumption data includes the timestamp associated with the power consumption data.

9. The method of claim 1 wherein the at least one packet related power consumption metric includes an average power consumption value per packet, an average power consumption value per packet stream, an average power consumption value per test session, a maximum or peak power consumption value associated with a packet type, a maximum or peak power consumption value associated with a packet stream, a maximum or peak power consumption value associated with a test session, a minimum power consumption value associated with a packet type, a minimum power consumption value associated with a packet stream, or a minimum power consumption value associated with a test session.

10. The method of claim 9 wherein the timestamp associated with the at least one test packet indicates a transit time that a first packet was sent to the SUT or a receive time that a first packet was received by the SUT.

11. A system for obtaining power consumption data associated with packet processing, the system comprising:
    at least one processor; and
    a test device implemented using the at least one processor, the test device configured for:
        sending, via a first communications interface, at least one test packet to a system under test (SUT), wherein a timestamp associated with the at least one test packet is generated by the test device;
        receiving, via a second communications interface, power consumption data associated with the at least one test packet, wherein a timestamp associated with the power consumption data associated with the at least one test packet is generated or obtained by the test device;
        correlating the power consumption data and test packet information to generate at least one packet related power consumption metric, wherein correlating the power consumption data and the test packet information includes using the timestamp associated with the power consumption data and the timestamp associated with the at least one test packet for correlation; and
        generating, using the correlated power consumption data and test packet information, the at least one packet related power consumption metric.

12. The system of claim 11 wherein the test device is configured for:
    generating, using the power consumption data and test packet information, a report.

13. The system of claim 11 wherein the first communications interface includes a physical layer interface.

14. The system of claim 11 wherein the SUT includes a system on a chip (SoC), an emulated SoC, a programmable logic device (PLD), an emulated PLD, a field-programmable gate array (FPGA), an emulated FPGA, an application-specific integrated circuit (ASIC), an emulated ASIC, or a hardware processor.

15. The system of claim 11 wherein the second communications interface is distinct from the first communications interface.

16. The system of claim 11 wherein the second communications interface is the same as the first communications interface.

17. The system of claim 11 wherein the power consumption data includes instantaneous power consumption data associated with processing, by the SUT, the at least one test packet.

18. The system of claim 11 wherein the at least one packet related power consumption metric includes an average power consumption value per packet, an average power consumption value per packet stream, an average power consumption value per test session, a maximum or peak power consumption value associated with a packet type, a maximum or peak power consumption value associated with a packet stream, a maximum or peak power consumption value associated with a test session, a minimum power consumption value associated with a packet type, a minimum power consumption value associated with a packet stream, or a minimum power consumption value associated with a test session.

19. The system of claim 11 wherein the timestamp associated with the at least one test packet indicates a transit time that a first packet was sent to the SUT or a receive time that a first packet was received by the SUT.

20. A non-transitory computer readable medium having stored thereon executable instructions that when executed by at least one processor of a computer cause the computer to perform steps comprising:
    at a test device:
        sending, via a first communications interface, at least one test packet to a system under test (SUT), wherein a timestamp associated with the at least one test packet is generated by the test device;
        receiving, via a second communications interface, power consumption data associated with the at least one test packet, wherein a timestamp associated with the power consumption data associated with the at least one test packet is generated or obtained by the test device;
        correlating the power consumption data and test packet information to generate at least one packet related power consumption metric, wherein correlating the power consumption data and the test packet information includes using the timestamp associated with the power consumption data and the timestamp associated with the at least one test packet for correlation; and
        generating, using the correlated power consumption data and test packet information, the at least one packet related power consumption metric.

* * * * *

UNITED STATES PATENT AND TRADEMARK OFFICE
CERTIFICATE OF CORRECTION

PATENT NO. : 10,073,931 B2  
APPLICATION NO. : 15/291034  
DATED : September 11, 2018  
INVENTOR(S) : Michelle Renee Havard Page 1 of 1

It is certified that error appears in the above-identified patent and that said Letters Patent is hereby corrected as shown below:

On the Title Page

Item (71), in Column 1, in "Applicant", Line 1, delete "Ixia, Calabasas, CA (US)" and insert
-- Keysight Technologies Singapore (Holdings) Pte. Ltd., Minneapolis, MN (US) --, therefor.

Signed and Sealed this
Sixth Day of August, 2019

Andrei Iancu
*Director of the United States Patent and Trademark Office*